(12) United States Patent
Chung et al.

(10) Patent No.: US 9,311,865 B1
(45) Date of Patent: Apr. 12, 2016

(54) DISPLAY WITH ACTIVE MATRIX LIGHTGUIDE

(71) Applicant: Amazon Technologies, Inc., Reno, NV (US)

(72) Inventors: Jerry Yee-Ming Chung, Los Altos, CA (US); Siddharth Gupta, San Bruno, CA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 14/132,943

(22) Filed: Dec. 18, 2013

(51) Int. Cl.
*G09G 3/34* (2006.01)
*G02B 26/00* (2006.01)

(52) U.S. Cl.
CPC .............. *G09G 3/344* (2013.01); *G02B 26/005* (2013.01)

(58) Field of Classification Search
CPC ..... G09G 3/344; G09G 3/3473; G09G 3/348; G02B 26/005; G02B 26/0841; G02B 26/001; G02B 26/0833; G02B 26/006; G02B 2207/115; G02F 1/167
USPC ........... 345/102, 107; 349/201; 359/290–296; 362/607
See application file for complete search history.

(56) References Cited

U.S. PATENT DOCUMENTS

| | | | | |
|---|---|---|---|---|
| 7,593,617 B2* | 9/2009 | Klunder | ................. | G02B 6/122 385/146 |
| 8,456,514 B2* | 6/2013 | Leister | ................. | G02B 26/005 348/40 |
| 8,675,273 B2* | 3/2014 | Yang | .................... | G02B 26/005 359/290 |
| 8,681,423 B1* | 3/2014 | Gibson | ................ | G02B 6/0035 349/196 |
| 2008/0266863 A1 | 10/2008 | Rinko | | |
| 2012/0243071 A1* | 9/2012 | Lee | ....................... | G02B 26/005 359/290 |
| 2013/0208336 A1* | 8/2013 | Yang | .................... | G02B 26/005 359/290 |
| 2014/0340286 A1* | 11/2014 | Machida | ............ | G02B 26/0833 345/8 |

OTHER PUBLICATIONS

U.S. App. No. 13/647,985, filed Oct. 9, 2012, Zehner et al.
Feenstra, Johan; et al. "Electrowetting Displays," Liquavista, May 2009, pp. 1-15.

* cited by examiner

*Primary Examiner* — Rodney Amadiz
(74) *Attorney, Agent, or Firm* — Weaver Austin Villeneuve & Sampson LLP

(57) ABSTRACT

A display includes a lightguide having an array of light extraction features that can be actively controlled to direct varying amounts of light received from one or more light sources arranged at the edge of the display. The light extraction features include two fluids with different refractive indices. The relative positions of the fluids in each light extraction feature are controlled, e.g., by electrowetting, to control the amount of light directed toward the display.

20 Claims, 7 Drawing Sheets

DISPLAY WITH ACTIVE MATRIX LIGHTGUIDE

BACKGROUND

A reflective display such as an electrophoretic display typically includes light sources (e.g., light-emitting diodes or LEDs) arranged at the edge of the display and a lightguide in parallel with the display to transmit the light energy from the light sources to the display. Conventional lightguides include an array of light extraction features that receive the light from the light sources and refract and/or diffract it toward the display based on one or more of difference in refractive index of lightguide materials and surrounding materials, light extraction feature geometry, and light extraction feature placement on the lightguide. Conventional light extraction features in such lightguides are fixed, passive structures that are distributed across the lightguide to ensure an even distribution of the light energy from the light sources which are typically arranged only at one edge of the display.

DETAILED DESCRIPTION

This disclosure describes a display (e.g., a reflective or transmissive display) for use in electronic devices such as, for example, smart phones and tablet computing devices. The display includes a lightguide having an array of light extraction features that can be actively controlled to direct varying amounts of light received from one or more light sources arranged at the edge of the display. The light extraction features include two fluids with different refractive indices. The relative positions of the fluids in each light extraction feature are controlled, e.g., by electrowetting, to control the amount of light directed toward the display. The ability to independently control the light extraction features associated with different regions of the display enables selective highlighting of particular regions and/or particular visual objects presented on the display.

Figure 1:
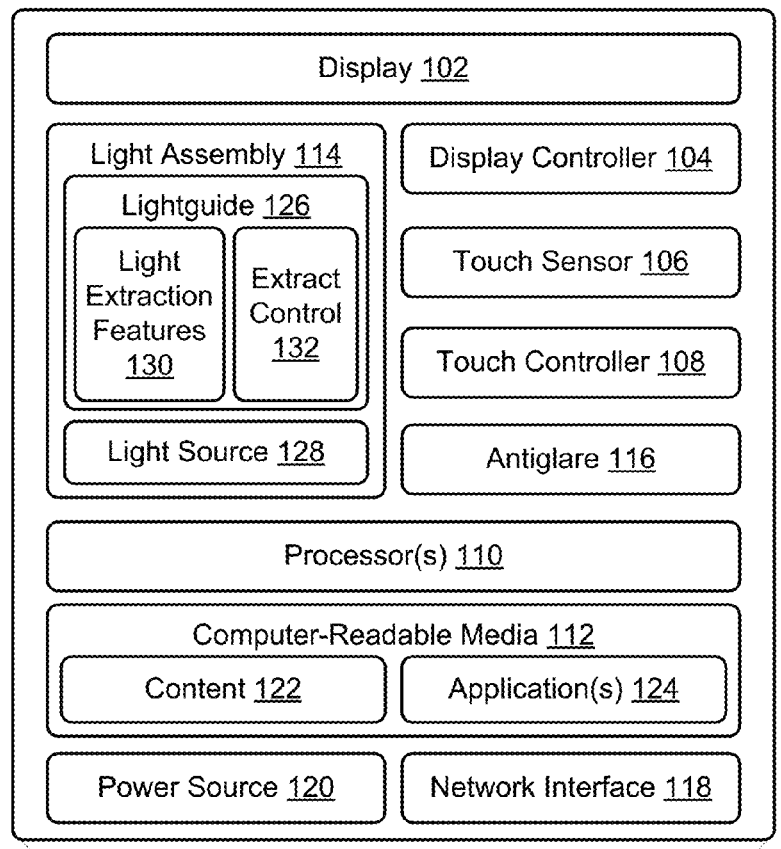
FIG. 1 is a simplified block diagram of an electronic device according to a particular class of implementations.
Figure 1:
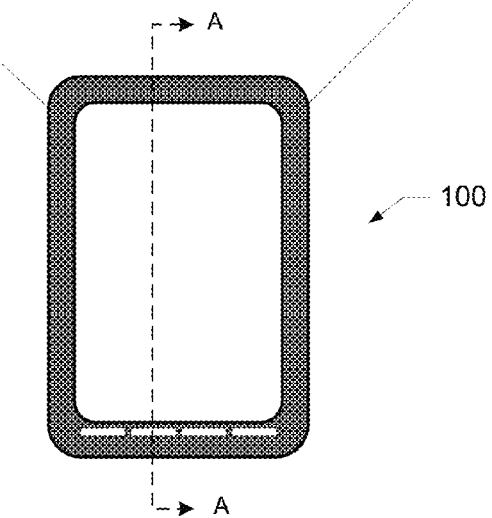

FIG. 1 illustrates an example of an electronic device 100 that includes a display implemented as described herein. Device 100 may comprise any type of mobile electronic device (e.g., an electronic book reader, a tablet computing device, a laptop computer, a smart phone, etc.) or non-mobile electronic device (e.g., a desktop computer, a television, etc.). In addition, while FIG. 1 includes several examples of components of such an electronic device 100, it is to be appreciated that device 100 may also include other conventional components, such as an operating system, system busses, input/output components, and the like.

Regardless of the specific implementation of electronic device 100, the device includes a display 102 and a corresponding display controller 104. Display 102 may represent a reflective display such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. It should be noted, however, that despite references to implementations of reflective displays, it should be noted that implementations of backlit and transmissive displays using the techniques described herein are contemplated.

In one implementation, display 102 is an electrophoretic display that moves particles between different positions to achieve different color shades or different shades of gray. However, it is to be appreciated that the reflective displays described herein may comprise any other type of electronic-paper or reflective-display technology, such as gyricon displays, electrowetting displays, electrofluidic displays, interferometric modulator displays, cholestric liquid crystal displays, and the like.

In addition to display 102, device 100 includes a touch sensor 106 and a touch controller 108. In some instances, at least one touch sensor 108 resides atop display 102 to form a touch-sensitive display. Touch sensor 106 may be a capacitive touch sensor, a force sensitive resistance (FSR), an interpolating force sensitive resistance (IFSR) sensor, or any other type of touch sensor. In some instances, touch sensor 108 is capable of detecting touches as well as determining an amount of pressure or force of these touches.

Device 100 also includes one or more processors 110 and computer-readable media 112, as well as a light assembly 114 for lighting display 102, an antiglare component 116 for reducing glare of incident light, one or more network interfaces 118 and one or more power sources 120. In the following description, light assembly 114 is referred to as being a front light (e.g., as used with a reflective display). However, it will be noted that for some implementations, light assembly 114 may be a back light (e.g., as used with transmissive or backlit displays) Network interfaces 118 may support both wired and wireless connection to various networks, such as cellular networks, radio, WiFi networks, short range networks (e.g., Bluetooth), IR, and so forth.

Computer-readable media 112 may include volatile and nonvolatile memory such as, for example, RAM, ROM, EEPROM, flash memory, or other memory technology, or any other medium which can be used to store content or applications and data which can be accessed by electronic device 100. Computer-readable media 112 may be used to store any number of functional components that are executable on processors 110, as well content 122 and applications 124. Thus, for example, computer-readable media 112 may include an operating system and/or a storage database to store one or more content items, such as eBooks, audio books, music tracks, videos, still images, and the like. Computer-readable media 112 may also store one or more content presentation applications to render content items on device 100. For instance, such an application may be an electronic book reader application for rendering textual electronic books, an audio player for playing audio books or music tracks, a video player for playing video, and so forth.

In some instances, electronic device 100 may include a cover to protect the display (and other components in the stack) of the device. Device 100 and/or the cover may include a sensor (e.g., a hall-effect sensor) to detect when the cover is open. The sensor may send a signal to front light 114 when the cover is open and, in response, front light 114 may illuminate the display. Alternatively, when the cover is closed front light 114 may receive a signal indicating that the cover has closed and, in response, the front light may turn off.

The amount of light emitted by front light 114 may vary. For instance, upon a user opening the cover, the light from the front light may gradually increase to its full illumination. In some instances, device 100 includes an ambient light sensor and the illumination of front light 114 may be based at least in part on the amount of ambient light detected by the ambient light sensor. For instance, front light 114 may be brighter if the ambient light sensor detects relatively little ambient light, and may be dimmer if the ambient light sensor detects a relatively large amount of ambient light. This may be effected by control of light source(s) 128. In addition or alternatively, this may be effected by active control of light extraction features 130 of lightguide 126 (e.g., by display controller 104 via light extraction control circuitry 132) as described herein. It should be noted that although control circuitry 132 is shown in FIG. 1 as part of lightguide 126, this is merely by way of example. That is, as will be discussed and according to various implementations, some or all of this control circuitry might alternatively be part of a separate assembly adjacent or otherwise in proximity to lightguide 126. Suitable variations and alternatives will be understood by those of skill in the art.

Front light 114 includes lightguide 126 and light source(s) 128. Lightguide 126 is constructed from a substrate (e.g., a transparent thermoplastic such as poly-methyl methacrylate (PMMA) or polycarbonate) and includes an array of light extraction features 130 that function to direct light from light source(s) 128 toward reflective display 102, thus illuminating display 102. Depending on the nature of the light extraction features, this may occur through refraction, diffraction, or some combination of those phenomena. To form light extraction features 130, a layer of lacquer may be applied to the substrate of lightguide 126, the light extraction features may be embossed or stamped in the layer of lacquer, and lightguide 126 may be UV-cured. Alternatively, the substrate of the lightguide and the light extraction features may be manufactured as a single element, e.g., via an injection molding process. In some instances, the UV lacquer is made of a cross-linked, tri-functional polymer material that co-polymerizes to a plastic solid when exposed to a high-intensity UV light source. Additional details relating to lightguide 126 and light extraction features 130 are described in further detail below with reference to FIGS. 3 and 4.

Light source(s) 128 may be one or more (e.g., four) light-emitting diodes (LEDs), which may arranged at one edge of the electronic device, e.g., the bottom edge as shown in FIG. 1. By positioning the LEDs along the bottom portion of display 102 relative to the content being displayed, light from light source(s) 128 is generally directed away from a user consuming the content and therefore not directly into the user's eyes.

Light energy from light source(s) 128 travels along the plane of lightguide 126 until it encounters a light extraction feature 130 at which point, depending on the configuration of the light extraction feature, may direct (via refraction, diffraction, or some combination of the two) some portion of the light energy toward display 102, or allow the light to pass through the light extraction feature and continue along lightguide 126. Mechanisms by which such control of a light extraction feature may be accomplished are described below.

Antiglare component 116 is a film that functions to reduce glare of ambient light incident on electronic device 100. The film may comprise a hard-coated polyester and polycarbonate film (including a base polyester or a polycarbonate) that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil).

Antiglare component 116 may be secured to a top surface of front light 114 via an optically clear adhesive (OCA), such as solid OCA, a liquid OCA (LOCA), or the like. In some instances, a refractive index of the OCA atop front light 114 and a refractive index of the OCA beneath front light 114 are both less than a refractive index of lightguide 126. For instance, the difference between the refractive index of lightguide 126 and the refractive index of each of the OCAs may be at least 0.3 in some instances. Selecting materials having low refractive indices on both sides of lightguide 126 may result in total internal reflection or near-total internal reflection of light from light source 128 (when not otherwise directed by light extraction features 130). Antiglare component 116 may, in some instances, also include a UV filter for the purpose of protecting components lower in the stack from UV of the light incident on electronic device 100.

While FIG. 1 depicts examples of components, electronic device 100 may have additional features or functionality. For example, device 100 may also include additional data storage devices (removable and/or non-removable) such as, for example, magnetic or optical disks. The additional data storage media may include volatile and nonvolatile, removable and non-removable media implemented in any method or technology for storage of information, such as computer-readable instructions, data structures, program modules, or other data. In addition, some of the functionality described as residing within device 100 may reside remotely from device 100. In such implementations, device 100 may utilize network interfaces 118 to communicate with and utilize this functionality.

Figure 2:
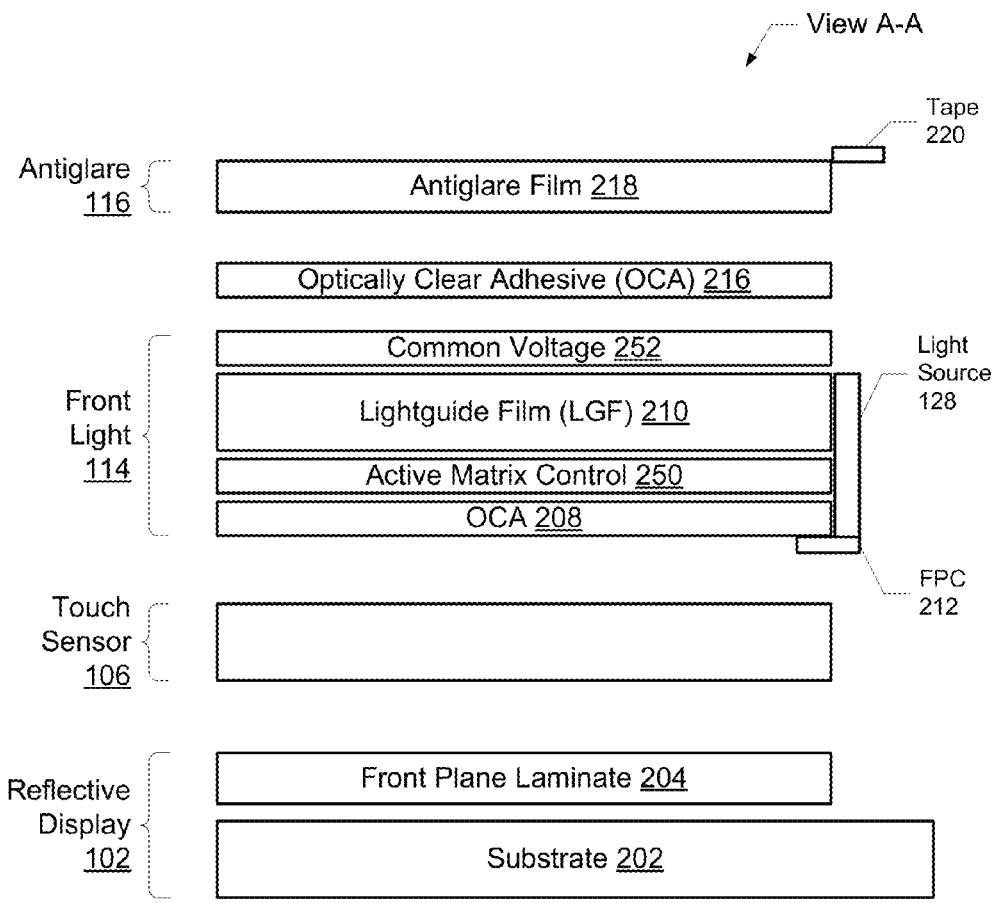
FIG. 2 is a simplified representation of a display stack according to a particular class of implementations.

FIG. 2 illustrates an example of a schematic cross-section of the display components of electronic device 100 along the line A-A from FIG. 1. The cross-section illustrates antiglare component 116 residing atop front light 114, which resides atop touch sensor 106, which resides atop reflective display 102. As illustrated, in this example reflective display 102 includes a substrate 202 (which may be glass, plastic, etc.) and a front plane laminate (FPL) 204. In some instances, FPL 204 comprises e-ink capsules, as well as the fluid in which the capsules move up or down in connection with operation of electronic-paper displays. In addition, FPL 204 may include a plastic film structure onto which the e-ink is coated using a roll-to-roll process. Thereafter, a conductive transparent electrode plastic film may then be combined with an adhesive layer and a release sheet to form one implementation of FPL 204.

Touch sensor 106 resides atop reflective display 102 and may be or include a glass touch component, a film touch component, or a suitable alternative). In instances where touch sensor 106 comprises a capacitive touch sensor, traces made from Indium tin oxide (ITO), copper, printed ink or the like may reside atop touch sensor 106. An acrylic material may reside atop the traces for protection, with the color of this acrylic layer being tuned to ensure that a resulting color of display 102 viewed by a user is correct. Furthermore, in some instances touch sensor 106 may include a transparent conductor other than, or in addition to, ITO.

Front light 114 (which would be a back light for implementations of transmissive displays) may reside atop touch sensor 106 and includes a lightguide film (LGF) 210 in which an array of light extraction features (e.g., light extraction features 130) are formed for directing light from light source 128 onto reflective display 102. As mentioned above and as will be described in further detail below, the light extraction features are filled with at least two fluids that enable active control of the light extraction properties of each feature. Electrodes and selection circuitry of active matrix control layer 250 may be formed on, adjacent, or otherwise in proximity to the surface of LGF 210 to effect this control in conjunction with one or more electrodes of common voltage layer 252 formed on, adjacent, or otherwise in proximity to the opposing surface of LGF 210. The circuitry of these layers may also be formed on or in the adjacent adhesive layers (e.g., OCA 208 and 216), or even on or in separate substrates positioned on either side of LGF 210. Using the electrodes of these layers, voltage potentials may be applied selectively across the light extraction features (e.g., under control of display controller 104), causing the relative positions of the fluids contained in each to change (with little or no mixing of the fluids), thereby changing the light extraction properties of each light extraction feature and the amount of light directed toward the display 102. According to a particular class of implementations, the fluids in the light extraction features may be deposited or dispensed and then sealed in the light extraction features by placement and securing (e.g., by lamination) of a sheet of solid OCA (e.g., OCA 208) to lightguide film 210.

To mitigate or reduce optical degradation, the electrodes, conductors, and other circuitry of layers 250 and 252 may be formed using any kind of transparent or substantially transparent conductive material such as, for example, Indium tin oxide (ITO), carbon nanotubes, and the like. According to various implementations, the circuitry of layer 250 may be arranged to selectively apply potentials across subsets of the light extraction features with varying levels of granularity. For example, circuitry (including electrodes, conductors, and/or selection circuitry) may be configured to enable individual selection and control of each light extraction feature or group of light extraction features. Alternatively, multiple groups of light extraction features may be selected and controlled in parallel. The number, size, and configuration of such collections of features or groups of features may vary depending on the particular application. The selection and control scheme may be fixed by the way in which layers 250 and 252 are configured. However, implementations are also contemplated in which the numbers and locations of light extraction features or groups of features controlled together may be varied during operation (e.g., by selection circuitry) to enable a high degree of flexibility with which the overall light extraction characteristics of lightguide 126 may be controlled.

The granularity of control of the light extraction characteristics of the individual light extraction features may also vary. For example, according to one class of implementations, only binary control of each light extraction feature is enabled, i.e., each light extraction feature may only be switched between two states or configurations; a maximal light extraction configuration in which it directs a significant portion of the light energy it receives toward the display, and a minimal light extraction configuration in which it allows a significant portion of the light energy to continue down the lightguide. In other examples and according to other classes of implementations, intermediate configurations or even continuous control of the characteristics of each light extraction feature may be provided. Continuous control refers to the ability to modify the relatively configurations of the fluids in the light extraction features to effect smooth adjustment of the amount of light energy directed toward the display between the maximal and minimal configurations.

The nature of the control circuitry necessary to achieve these different levels of control will depend on the particular application, and may include electrodes configured to apply potentials across the light extraction features, conductors for transmitting signals to the electrodes, and selection circuitry (e.g., arrays of switches or logic) for selecting the conductors and electrodes (e.g., under control of a display controller or other processor). The electrodes are disposed in sufficient proximity to the light extraction features to achieve the electrowetting effect and may be disposed in or on the lightguide, an immediately adjacent layer of material, or in or on a layer of material separated from the lightguide by one or more intervening layers of material. The locations of the conductors connected to the electrodes and the selection circuitry may be similarly diverse depending on the application. The controller(s) connected to and configured to control this control circuitry may be located at any suitable location within the electronic device housing. Suitable alternatives for these conductors, electrodes and selection circuitry (e.g., light extraction control circuitry 132), and controller functionality for effecting such selection and control (e.g., display controller 104) will be understood by those of skill in the art.

Light source 128 may couple to a flexible printed circuit (FPC) 212. In some instances, light source 128 (e.g., one or more LEDs) may couple to FPC 212 via an optically clear adhesive (OCA), such as a solid strip of OCA, LOCA or the like. FPC 212 (and light source 128) may also couple to LGF 210 via OCA 208. In some instances, FPC 212 may include a light-diffusing reflective coating (e.g., in the form of a white, matte finish), which may help to diffuse and reflect light from light source 128 and thereby increase the uniformity of the light across front light 114 and display 102.

Another layer of OCA 216 (e.g., solid OCA, LOCA, etc.) may reside atop LGF 210 of front light 114. An antiglare film 218 of antiglare component 116 may then be laid atop OCA 216. In addition, a white tape 220 or other type of light-diffusing reflective coating may be laid along a perimeter of antiglare film 218 which may help to diffuse light from light source 128 and increase the uniformity of the light from light source 128.

It should be noted that while FIG. 2 illustrates a specific stack of components, other implementations are contemplated in which the types and order of components may differ. For instance, one implementation may include a glass touch component on top of the device (e.g., with or without an antiglare component) with touch-sensor traces residing underneath the glass. The front light might reside under the touch sensor with the reflective display residing underneath the front light. The scope of the present invention should therefore not be limited with reference to specific implementations described herein.

Figure 3:
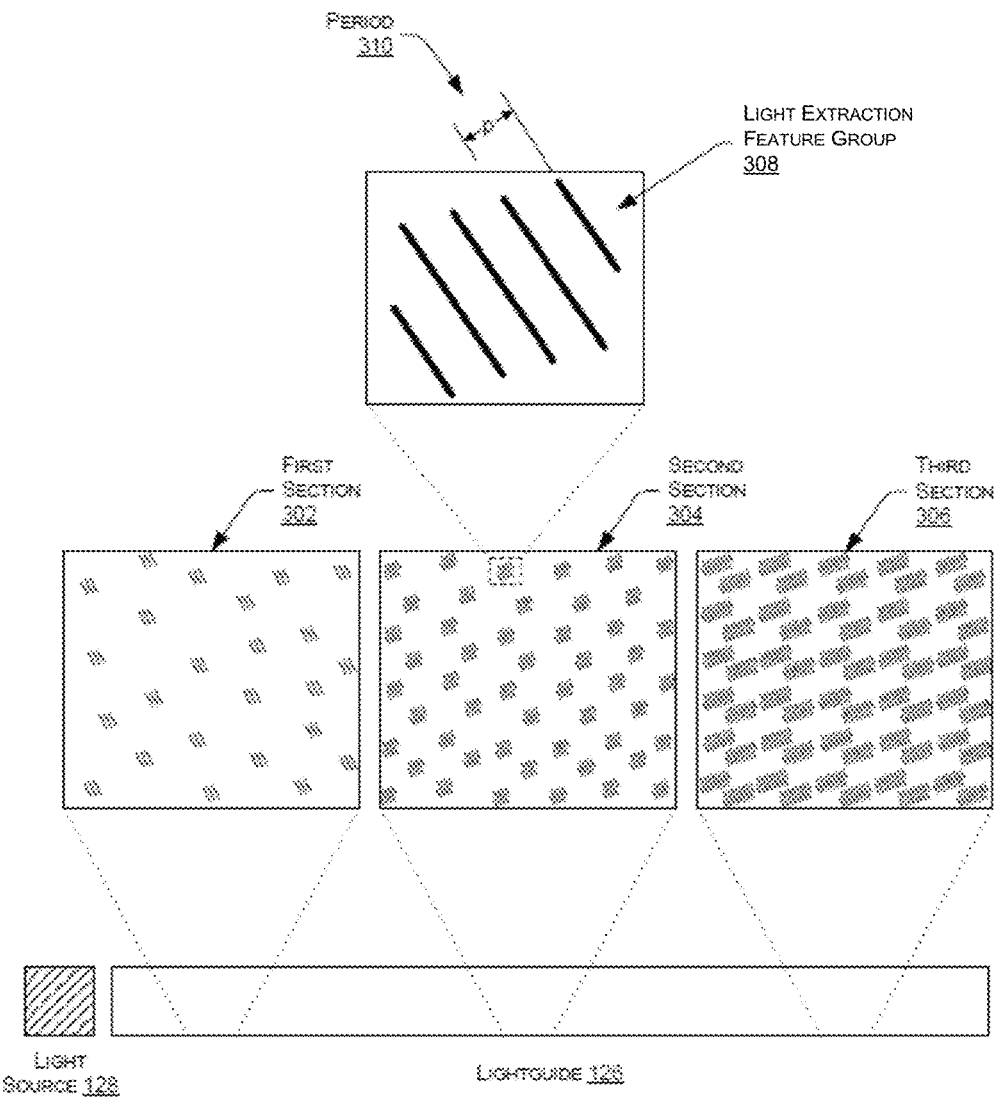
FIG. 3 shows an example of a lightguide having an active matrix of light extraction features according to a particular class of implementations.

FIG. 3 illustrates an example of a lightguide 126 adjacent a light source 128. As illustrated, lightguide 126 includes different sections having respectively different patterns of groups of light extraction features. The depicted example illustrates three different sections 302, 304 and 306, although lightguide 126 may include any number of sections and/or the distribution of light extraction features may continuously vary across the length of lightguide 126.

In the illustrated example, the nearer the section of lightguide 126 to light source 128, the fewer number of light extraction features (or groups of features) that section includes. That is, section 302 nearest light source 128 is shown to include fewer light extraction features (or groups of features) than section 304, which in turn includes fewer light extraction features (or groups of features) than section 306. Furthermore, as illustrated the orientation of the light extraction features (or groups of features) within the respective sections may vary to ensure propagation of the light to each portion of the display. Some dithering may also be added to the light extraction feature groups to avoid the Moiré-effect.

FIG. 3 illustrates a particular example of a light extraction feature group 308 for directing light from light source 128 onto a display. As illustrated, the light extraction features within group 308 are represented as parallel lines spaced from one another via a uniform period 310. The number of individual light extraction features of group 308 and/or characteristics (e.g., length, depth, orientation, etc.) of the light extraction features may be determined at least in part with reference to the group's distance from light source 128, with the number of light extraction features in each group increasing with increasing distance. In addition, a collection of light extraction feature groups may form a light extraction feature group pattern. For example, the collection of light extraction feature groups illustrated in section 302 may form a first pattern, the collection of light extraction feature groups illustrated in section 304 may form a second pattern, and the collection of light extraction feature groups illustrated in section 306 may form a third pattern.

Furthermore, while illustrated as parallel lines, the light extraction features may have a different profile or form different patterns in other implementations. For example, the light extraction features may have profiles that are binary, slanted, blazed, sinusoidal, x-shaped or the like. In some instances, different groups of light extraction features have different profiles. Light extraction features within a light extraction feature group may also differ from one another. For example, light extraction features within a group may have different depths, lengths, orientations, shapes or the like.

The light extraction features may be formed in a variety of ways, such as being embossed or stamped in a lacquer, injection molded as part of the manufacture of lightguide 126, directly embossed or stamped onto the substrate of lightguide 126 or the like. In other examples, the manufacture of the light extraction features may involve continuous or discrete casting methods (UV or thermal curing), compression molding, continuous or discrete embossing, such as hard embossing, soft embossing and UV embossing and the like. Melt film can also be used. Although many manufacturing processes may be utilized, some may be particularly suitable to manufacturing particular embodiments. For example, blazed type structural profiles may be manufactured by means of roll-to-roll UV-embossing or a melt film method in order to achieve accurate and high quality replication. Different kinds of figures and masks can be printed or laminated on lightguide 126 such as, for example, active matrix control circuitry 250.

Figure 4:
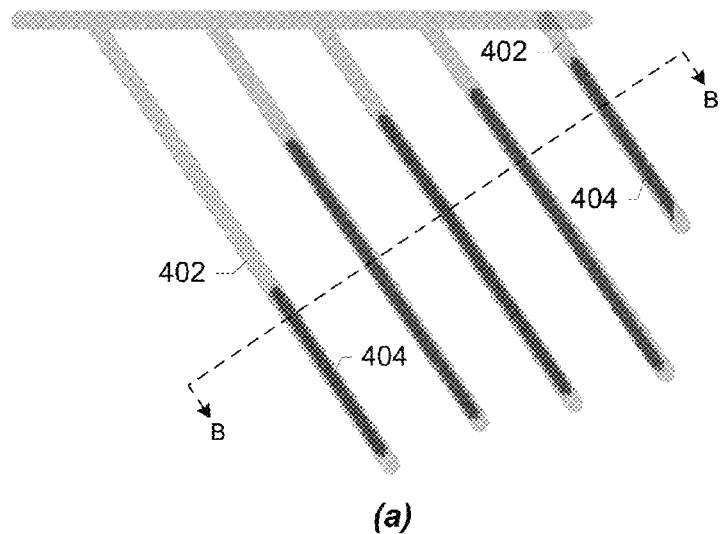
FIG. 4 illustrates control of a light extraction feature according to a particular class of implementations.
Figure 4:
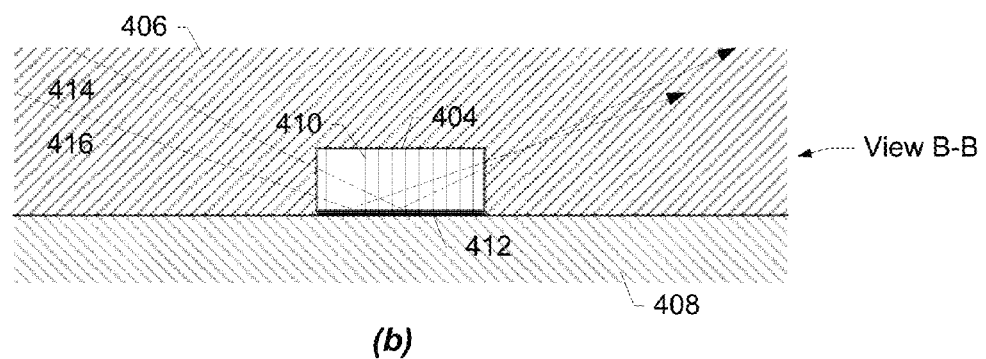
Figure 4:
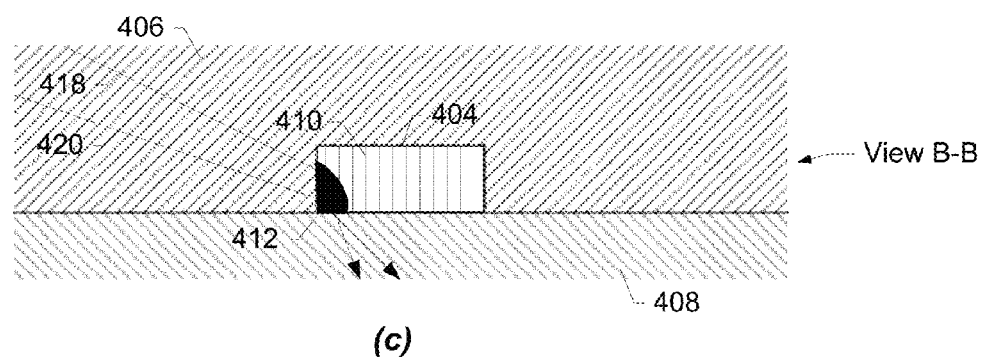

FIG. 4 illustrates manipulation of the light extraction characteristics of a light extraction feature of a lightguide in accordance with a particular implementation. FIG. 4(a) shows an example of a group of electrodes 402 in association with light extraction features 404 (which are similar to group 308 of FIG. 3). In this example, each electrode 402 is shown as coinciding with a corresponding feature 404 and may be disposed in the stack below its corresponding feature 404. Electrodes 402 may be controlled and activated, e.g., by selection circuitry under control of a display controller (not shown), to apply a potential across the associated light extraction features in conjunction with one or more corresponding electrodes or conductive structures on, adjacent, or otherwise in proximity to the opposing surface of the lightguide (not shown). In the example shown in FIG. 4(a), electrodes 402 are electrically coupled to each other and controlled together. However, it should be noted that implementations are contemplated in which the electrodes may be independently controlled to provide more granular control of the light extraction features or groups of features. Implementations are also contemplated in which multiple groups and/or larger patterns of groups of light extraction features may be controlled together. Suitable variations for particular applications will be understood by those of skill in the art.

The manner in which the light extraction characteristics of a particular one of light extraction features 404 may be controlled according to a particular implementation may be understood with reference to FIGS. 4(b) and 4(c). Both of these figures show simplified cross-sectional views along line B-B of FIG. 4(a) and include the cross-section of only a single one of light extraction features 404 for clarity. Light extraction feature 404 is shown having a rectangular cross-section, but it should be noted that a variety of cross-section shapes may be employed without departing from the scope of the invention.

Light extraction feature 404 forms a reservoir extending into the substrate of lightguide material 406 (having a refractive index n1) and sealed by an intermediate material 408 (having a refractive index n2) which may be, for example, a hydrophobic insulating material. This intermediate material may be in addition to or included in, for example, OCA layer 208 of FIG. 2. Contained within the reservoir of light extraction feature 404 are fluids 410 and 412. Fluid 410 (which may be, for example, a silicone oil) has a refractive index n1' that substantially matches the refractive index n1 of lightguide material 406. Fluid 412 (which may be, for example, an aqueous solution of a metal halide salt such as potassium chloride (KCl) or sodium chloride (NaCl)) has a refractive index n2' that closely matches the refractive index n2 of intermediate material 408 (e.g., within about 0.01), and is different from the refractive index n1 of lightguide material 406 by at least about 0.05. The fluids are preferably of sufficiently different densities such that there is little or no mixing of the fluids. By the application and manipulation of a suitable potential across light extraction feature 404 (e.g., via an electrode 402 and an opposing common electrode or plane), the light extraction characteristics of light extraction feature 404 may be controlled between a minimal light extraction configuration shown in FIG. 4(b) to a maximal light extraction configuration shown in FIG. 4(c).

That is, FIG. 4(b) shows fluid 412 distributed across the surface defined by the interface with intermediate material 408 in a way that results in the light extraction feature 404 having a profile within lightguide material 406 that is dominated by fluid 410. Because the refractive index n1' of fluid 410 closely matches refractive index n1 of lightguide material 406 (e.g., within about 0.01), there is little or no refraction of light energy traveling within lightguide material 406 that encounters light extraction feature 404. This is illustrated by light rays 414 and 416 that enter light extraction feature 404, internally reflect off fluid 412 (in a manner similar to how they would reflect off intermediate material 408) and continue traveling down lightguide material 406.

By contrast, FIG. 4(c) shows fluid 412 configured at the leading edge of light extraction feature 404 such that light energy encountering the light extraction feature (i.e., light rays 418 and 420) is refracted downward into intermediate material 408 (and toward the underlying reflective display). According to a particular implementation, a depression in intermediate material 408 (not shown) may coincide with light extraction feature 404 that accommodates the volume of fluid 412 in the minimal light extraction configuration such that the surface of fluid 412 in this configuration is substantially flush with the surface of the surrounding portion of intermediate material 408.

According to a particular class of implementations, control of the relative orientations of fluids 410 and 412 to modify the characteristics of the light extraction features is achieved through "electrowetting," i.e., the modification of the wetting properties of a surface through the application of an electric field. "Wetting" refers to the ability of a fluid to maintain contact with a surface and reflects a balance between adhesive and cohesive forces. As the magnitude of the applied electric field changes, the balance of these forces is affected, changing the contact angle between the fluid and the surface, and therefore the shape of the fluid on the surface (e.g., fluid 412 on intermediate material 408). According to various implementations, the magnitude and polarity of the electric field required to achieve the respective configurations may vary depending on a variety of factors including, for example, the nature of the fluids and their respective volumes, as well as the wetting property of the adjacent surface. For example and according to a particular implementation in which fluid 412 is an aqueous solution, the configuration shown in FIG. 4(c) may be achieved with the application of a potential that increases or maximizes the hydrophobic property of the surface of intermediate material 408; the contact angle between fluid 412 and intermediate material 408 being maintained as high, thereby keeping fluid 412 against the leading edge of light extraction feature 404. However, the application of an electric field of a suitable magnitude and polarity causes fluid 412 to oppose this force through the electrowetting effect and to flatten against the surface of intermediate material 408 as shown in FIG. 4(b). In some cases, fluids 410 and 412 are neutrally charged fluids. However, implementations are contemplated in which either or both of fluids 410 and 412 may carry a charge. Suitable alternatives for particular applications, fluids and materials are known to those of skill in the art.

As will be appreciated, for some implementations the volume of fluid 410 may be significantly greater than that of fluid 412 in order that a minimal light extraction configuration may be achieved in which little or no light is refracted toward the reflective display (i.e., because fluid 410 dominates the volume of the reservoir and appears to be part of the lightguide material). However, it will also be appreciated that the relative volumes of fluids 410 and 412 within a light extraction feature 404 may vary depending on a variety of factors including, for example, the range of light extraction control desired, the nature of the fluids, the size and geometry of the light extraction feature, etc. For example, if a narrower range of control over how much light is extracted by a light extraction feature is acceptable, the volume of fluid 412 may be closer to that of fluid 410. In another example, the volume of fluid 412 may be intended to approximate the size of a fixed light extraction feature in a conventional lightguide. That is, for example, fixed light extraction features in a conventional lightguide using a group similar to group 308 of FIG. 3 might have a width of 4 microns, a depth of 1.5 microns, and a spacing of 12 microns between features in the group. According to a particular class of implementations of the present invention, the size of the reservoir of the light extraction feature is significantly larger than the size of such a conventional fixed light extraction feature to accommodate an amount of fluid 410 that approximates the size of the conventional fixed light extraction feature when configured, for example, in the maximal light extraction configuration. Other examples will be apparent to those of skill in the art.

And as mentioned above, according to some implementations, the light extraction features may be switched between only two configurations, i.e., the minimal and maximal light extraction configurations. However, implementations are contemplated in which one or more intermediate states (or even a continuous range of states) may be achieved by correspondingly varying the electric field across the features.

Figure 5:
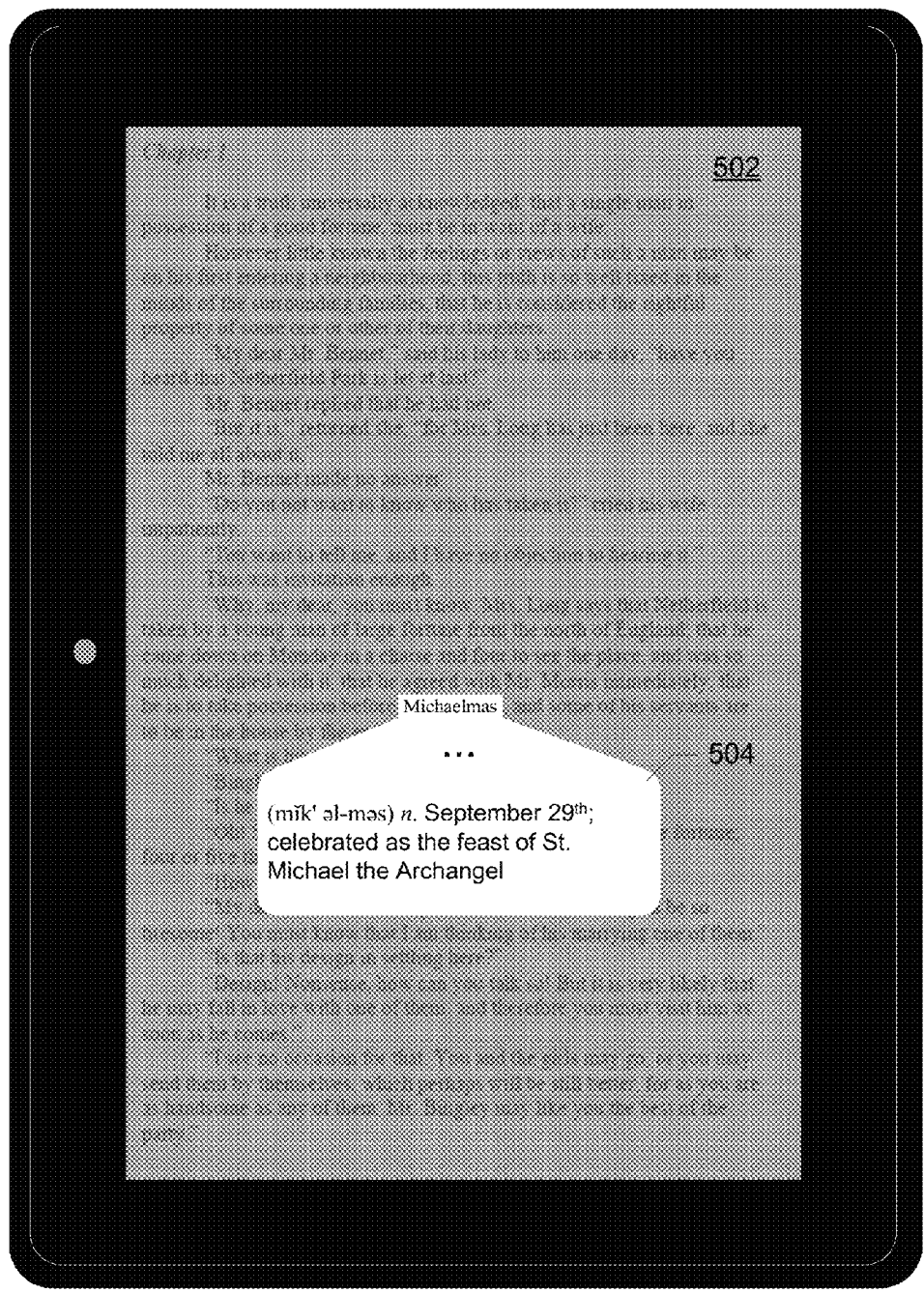
FIGS. 5-7 illustrate examples of applications of an active matrix lightguide.

As will be appreciated by those of skill in the art, the ability to actively and selectively control the light extraction features of the front light of a reflective display as described herein enables a variety of applications in which specific portions of a display may be highlighted relative to other portions of the display. For example, word definitions in an e-book might be highlighted as shown in interface 502 of FIG. 5. In the depicted example, in response to selection of the word "Michaelmas" in the text of an e-book, the definition of the word is provided in a dialogue box 504 that is highlighted by selective dimming of the remainder of the display, e.g., by controlling the light extraction features of the remainder of the display to direct less light toward the underlying reflective display than the light extraction features associated with dialogue box 504.

Figure 6:
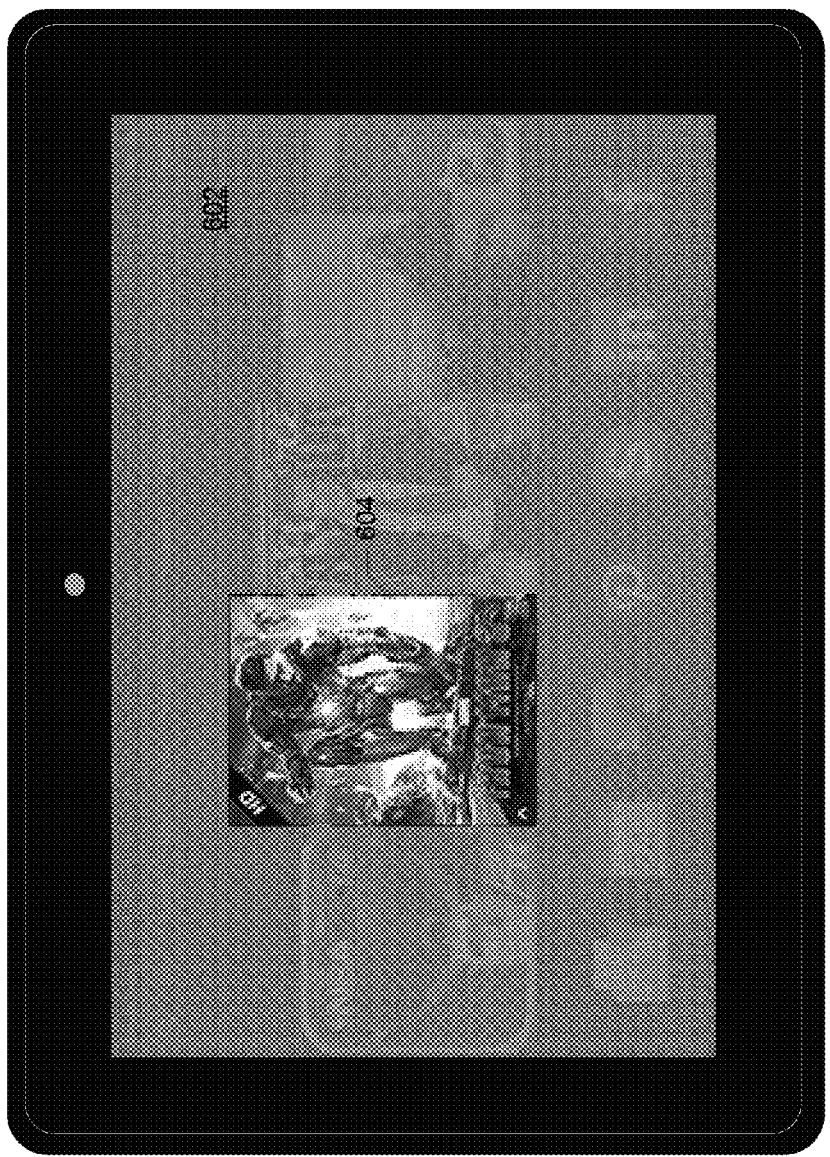
Figure 7:
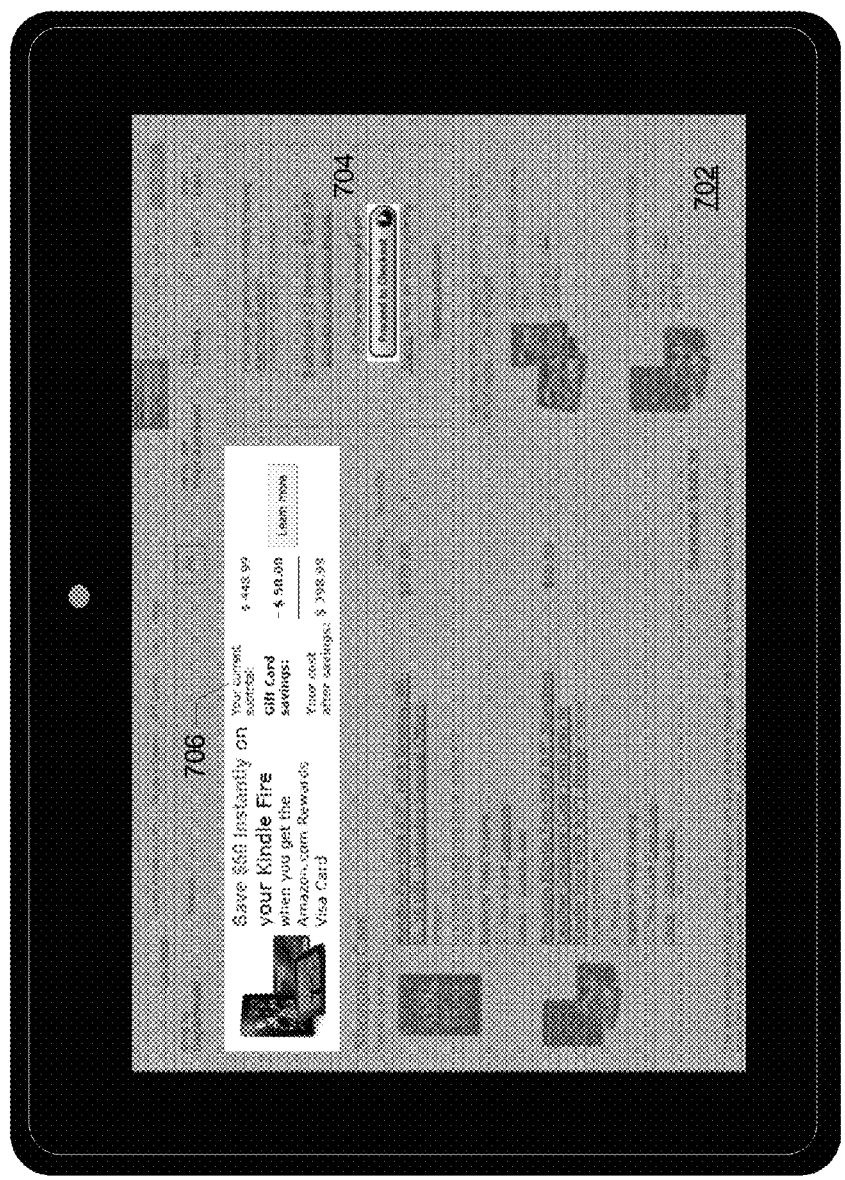

In another example shown in FIG. 6, a selectable object 604 (e.g., in this case representing a movie) is highlighted in interface 602 relative to the remainder of the display. In yet another example shown in FIG. 7, multiple regions in interface 702 are highlighted relative to the remainder of the display, i.e., a first region corresponding to a control object, e.g., button 704, and a second region corresponding to banner advertisement 706 (which may be selectable or include selectable objects). Regions of a display might be highlighted as depicted, for example, to draw the user's attention to a product or service to promote that product or service, or to induce or otherwise facilitate a user to take a particular action, e.g., "Proceed to Checkout."

Other examples of contemplated applications include selective illumination of the path of a finger or stylus across the display (e.g., drawing a circle around something or drawing generally), subtle highlighting to draw a user's attention to particular portions or objects in an interface, adjusting a brightness level of a display in response to changes in ambient light, etc. As will be appreciated, these are merely a few examples of the wide variety of applications in which the techniques described herein may be employed.

In each of these examples, the characteristics of selected light extraction features are manipulated to achieve the desired effect by one or more processors e.g., display controller 104 of FIG. 1 which may operate in conjunction with other controllers or processors, e.g., processor(s) 110 of FIG. 1 to control the display and to display content. For example, in conjunction with display of an interface, processors(s) 110 may identify a particular region of the display that should be highlighted and provide this information to display controller 104. Display controller 104 would then selectively control the light extraction features of the lightguide via the light extraction control circuitry to achieve the desired effect.

In yet another application, local dimming of a display may be achieved using the selective illumination capabilities described herein. That is, for a given interface or image frame, the darker areas of the interface or image don't require as much illumination of the display as the brighter areas. The active matrix control of light extraction features described above may be employed in conjunction with dimming of the light source to selectively highlight the brighter areas of the interface or image relative to the darker areas, thereby saving some (and possibly a considerable amount of) power.

According to a particular set of implementations, configurable light extraction features as described herein may be used to compensate for defects in lightguides thereby increasing manufacturing yield. That is, a display assembly including such a lightguide may be calibrated in the factory by selectively adjusting the light extraction characteristics of the features to arrive at a desired illumination distribution. This state may then be stored in the memory of the device and treated as the ground or default state from which selective highlighting of the display as described elsewhere herein may be accomplished.

While the subject matter of this application has been particularly shown and described with reference to specific implementations thereof, it will be understood by those skilled in the art that changes in the form and details of the disclosed implementations may be made without departing from the spirit or scope of the invention. For example, a range of illumination or dimming for a given region of a display may be achieved by the use of intermediate states of the light extraction features associated with that region. However, it may also be achieved with binary states of the light extraction features by selectively controlling some percentage of elements in the region to direct the desired amount of light in that region of the display. In another example, selective control of light extraction features may be done in conjunction with modulation of the light from the light source(s), e.g., to promote efficient transmission of the light to the display by placing most or all of the features in the maximal light extraction configuration.

In addition, although specific implementations of reflective displays are described herein, it should be understood by those of skill in the art that lightguides constructed as described herein may be used to implement other types of displays such as, for example, backlit or transmissive displays. That is, it should be understood that a lightguide with active matrix control as described herein may be used to distribute light in these other types of displays to achieve selective highlighting of such displays. Therefore, the present invention should not be limited by reference to the implementations of reflective displays described herein.

Examples of some of these implementations are illustrated in the accompanying drawings, and specific details are set forth in order to provide a thorough understanding thereof. It should be noted that implementations may be practiced without some of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. An electronic device, comprising:
   one or more processors;
   one or more memories; and
   a display assembly for displaying content under control of the one or more processors and the one or more memories, the display assembly including a reflective display, a lightguide, a light source, control circuitry, and an intermediate material disposed between the lightguide and the reflective display, the lightguide including a plurality of light extraction features formed therein adjacent the intermediate material, the light extraction features being configured to direct light received from the light source toward the reflective display under control of the control circuitry, each light extraction feature comprising a reservoir extending into the lightguide and having a first fluid and a second fluid contained therein, the first fluid characterized by a first refractive index that is substantially the same as a second refractive index of the lightguide, the second fluid characterized by a third refractive index that is different from the first refractive index and substantially the same as a fourth refractive index of the intermediate material, wherein the control circuitry is configured to control the second fluid associated with each of the light extraction features using electrowetting by applying a corresponding potential to change a contact angle between the second fluid and a surface of the intermediate material and to thereby move the second fluid between a first configuration and a second configuration.

2. The electronic device of claim 1, wherein the control circuitry is configured to control the second fluid in each of the light extraction features to correspond to one or more intermediate configurations between the first configuration and the second configuration by applying one or more corresponding magnitudes of the corresponding potential, each intermediate configuration directing a different amount of the light received from the light source toward the reflective display.

3. The electronic device of claim 2, wherein the control circuitry is configured to effect substantially continuous control of the second fluid in each of the light extraction features between the first configuration and the second configuration by applying a correspondingly continuous range of the corresponding potential.

4. The electronic device of claim 1, wherein the control circuitry is configured to independently control different subsets of the light extraction features associated with different regions of the reflective display to direct different amounts of the light received from the light source toward the reflective display, thereby selectively highlighting one or more of the regions of the display relative to one or more adjacent regions of the display.

5. A display assembly, comprising a lightguide substrate and control circuitry, the lightguide substrate including a plurality of light extraction features formed therein, the light extraction features being configured to direct light received from a light source toward an associated display under control of the control circuitry, each light extraction feature comprising a reservoir extending into the lightguide substrate and having a first fluid and a second fluid contained therein, the first fluid characterized by a first refractive index that is substantially the same as a second refractive index of the lightguide substrate, the second fluid characterized by a third refractive index that is different from the first refractive index, wherein the control circuitry is configured to control the second fluid associated with each of the light extraction features using electrowetting and to thereby move the second fluid between a first configuration and a second configuration.

6. The display assembly of claim 5, wherein the control circuitry is configured to control the second fluid in each of the light extraction features to correspond to only the first configuration or the second configuration.

7. The display assembly of claim 5, wherein the control circuitry is configured to control the second fluid in each of the light extraction features to correspond to one or more intermediate configurations between the first configuration and the second configuration.

8. The display assembly of claim 7, wherein the control circuitry is configured to effect substantially continuous control of the second fluid in each of the light extraction features between the first configuration and the second configuration.

9. The display assembly of claim 5, wherein the control circuitry is configured to independently control different subsets of the light extraction features associated with different regions of the display to direct different amounts of the light received from the light source toward the display, thereby selectively highlighting one or more of the regions of the display relative to one or more adjacent regions of the display.

10. The display assembly of claim 5, wherein the first and second fluids are sealed in the light extraction features with an intermediate material, and wherein the third refractive index of the second fluid is substantially the same as a fourth refractive index of the intermediate material.

11. The display assembly of claim 5, wherein the light extraction features are arranged in light extraction feature groups, the light extraction feature groups increasing in density with distance from a first edge of the lightguide.

12. The display assembly of claim 5, wherein the first fluid comprises a silicone oil and the second fluid comprises an aqueous solution of a metal halide salt.

13. The display assembly of claim 5, wherein the control circuitry includes electrodes that are formed on one or more surfaces of the lightguide substrate.

14. The display assembly of claim 5, wherein the control circuitry includes electrodes included in a component disposed in proximity to the lightguide substrate.

15. The display assembly of claim 5, wherein the display is one or more of a reflective display or a transmissive display.

16. A computer-implemented method for operating a display assembly to display an interface, the display assembly including a display, a lightguide, a light source, and control circuitry, the lightguide including a plurality of light extraction features formed therein, the light extraction features configured to direct light received from the light source toward the display under control of the control circuitry, each light extraction feature comprising a reservoir extending into the lightguide and having a first fluid and a second fluid contained therein, the first fluid characterized by a first refractive index that is substantially the same as a second refractive index of the lightguide, the second fluid characterized by a third refractive index that is different from the first refractive index, the method comprising:

using one or more processors, identifying a region of the display assembly corresponding to a portion of the interface to be highlighted; and using the one or more processors, selectively controlling the light extraction features of the lightguide via the control circuitry using electrowetting to thereby move the second fluid in each of the light extraction features between a first configuration and a second configuration such that the light extraction features corresponding to the identified region of the display assembly direct more of the light from the light source toward the display than the light extraction features corresponding to an adjacent region of the display assembly, thereby highlighting the portion of the interface corresponding to the identified region relative to a portion of the interface corresponding to the adjacent region.

17. The method of claim 16, wherein the portion of the interface corresponds to one or more of a selectable object, a control object, text, a word definition, an advertisement, a portion of a previously stored image, or a path of a finger or a stylus across a surface of the display.

18. The method of claim 16, further comprising calibrating a reference state for the display assembly by selectively controlling the light extraction features via the control circuitry to achieve a substantially uniform distribution of the light, and saving the reference state in associated memory.

19. The method of claim 16, further comprising controlling the light extraction features via the control circuitry to adjust a brightness level of the display assembly in response to ambient light.

20. The method of claim 16, wherein the portion of the interface corresponding to the identified region corresponds to a bright portion of the interface, and the portion of the interface corresponding to the adjacent region corresponds to a dark portion of the interface, and selective control of the light extraction features achieves local dimming of the display.

* * * * *